(12) United States Patent
Daufeld et al.

(10) Patent No.: US 11,946,789 B2
(45) Date of Patent: Apr. 2, 2024

(54) FILL LEVEL MEASURING DEVICE

(71) Applicant: Endress+Hauser SE+Co. KG, Maulburg (DE)

(72) Inventors: Ghislain Daufeld, Village Neuf (FR); Stefan Gorenflo, Hausen (DE); Alexey Malinovskiy, Maulburg (DE); Jens Merle, Schopfheim (DE); Markus Vogel, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 516 days.

(21) Appl. No.: 17/278,864

(22) PCT Filed: Aug. 19, 2019

(86) PCT No.: PCT/EP2019/072118
§ 371 (c)(1),
(2) Date: Mar. 23, 2021

(87) PCT Pub. No.: WO2020/064218
PCT Pub. Date: Apr. 2, 2020

(65) Prior Publication Data
US 2022/0034701 A1 Feb. 3, 2022

(30) Foreign Application Priority Data
Sep. 24, 2018 (DE) ............ 10 2018 123 429.5

(51) Int. Cl.
*G01F 23/284* (2006.01)

(52) U.S. Cl.
CPC ............... *G01F 23/284* (2013.01)

(58) Field of Classification Search
CPC .................................................. G01F 23/284
(Continued)

(56) References Cited

U.S. PATENT DOCUMENTS

| 4,620,788 A | * | 11/1986 | Giger | G01S 7/497 |
| | | | | 327/31 |
| 5,948,979 A | * | 9/1999 | Fitsch | G01F 23/284 |
| | | | | 73/290 V |

(Continued)

FOREIGN PATENT DOCUMENTS

| DE | 29815069 U1 | 12/1998 |
| DE | 60019118 T2 | 2/2006 |

(Continued)

*Primary Examiner* — Nuzhat Pervin
(74) *Attorney, Agent, or Firm* — Mark A. Logan; Endress+Hauser (USA) Holding, Inc.

(57) ABSTRACT

Disclosed is a method for a radar-based fill level measurement according to the pulse transit time method. Also disclosed a fill level measuring device for carrying out said method. On the basis of an evaluation signal, the relation between the clock rate and the sampling rate, and a predefined target relation, an evaluation curve is generated. The fill level is thereby determined on the basis of said evaluation curve. The evaluation curve is generated by means of temporal expansion or compression of the evaluation signal, wherein the compression or the expansion is carried out as a function of a ratio between the measured relation and the target relation. Any deviation of the sampling rate from the setpoint value of the sampling rate, for example due to faulty control, is compensated. Thus, the potentially attainable accuracy of the fill level measurement is increased due to the invention.

7 Claims, 3 Drawing Sheets

(58) Field of Classification Search
USPC .......................................................... 342/124
See application file for complete search history.

(56) References Cited

U.S. PATENT DOCUMENTS

| | | | | |
|---|---|---|---|---|
| 5,969,666 | A * | 10/1999 | Burger | G01S 7/411 |
| | | | | 342/124 |
| 6,169,706 | B1 * | 1/2001 | Woodward | G01F 23/2962 |
| | | | | 367/908 |
| 6,249,244 | B1 * | 6/2001 | Heidecke | G01F 23/284 |
| | | | | 367/908 |
| 7,412,337 | B2 * | 8/2008 | Michalski | G01F 23/284 |
| | | | | 702/55 |
| 7,619,558 | B2 * | 11/2009 | Griessbaum | G01S 13/18 |
| | | | | 342/135 |
| 8,497,799 | B2 * | 7/2013 | Kleman | G01F 23/288 |
| | | | | 342/124 |
| 8,854,253 | B2 * | 10/2014 | Edvardsson | G01F 23/284 |
| | | | | 342/127 |
| 11,022,475 | B2 * | 6/2021 | Welle | G01F 23/284 |
| 2002/0075976 | A1 * | 6/2002 | Richards | H04B 1/7163 |
| | | | | 370/503 |
| 2002/0133303 | A1 * | 9/2002 | Heidecke | G01F 23/284 |
| | | | | 702/55 |
| 2007/0103333 | A1 * | 5/2007 | Michalski | G01S 13/88 |
| | | | | 340/853.1 |
| 2007/0216568 | A1 * | 9/2007 | Kunert | G01S 13/34 |
| | | | | 342/107 |
| 2009/0100096 | A1 * | 4/2009 | Erlichson | H04L 67/02 |
| 2010/0223019 | A1 * | 9/2010 | Griessbaum | G01F 23/2962 |
| | | | | 342/124 |
| 2011/0279306 | A1 * | 11/2011 | Mouknatjou | G01S 13/103 |
| | | | | 342/124 |
| 2012/0056628 | A1 * | 3/2012 | Michalski | G01F 23/284 |
| | | | | 324/629 |
| 2012/0158363 | A1 * | 6/2012 | Hammer | G01D 3/10 |
| | | | | 702/183 |
| 2013/0276529 | A1 * | 10/2013 | Gerding | G01F 23/00 |
| | | | | 73/290 R |
| 2015/0160346 | A1 * | 6/2015 | Stutz | G01S 17/88 |
| | | | | 356/5.01 |
| 2015/0192449 | A1 * | 7/2015 | Malinovskiy, I | G01F 23/296 |
| | | | | 342/124 |
| 2015/0226594 | A1 * | 8/2015 | Frovik | G01S 13/88 |
| | | | | 342/124 |
| 2017/0370762 | A1 * | 12/2017 | Karimian-Sichany | |
| | | | | G01S 13/10 |
| 2018/0172805 | A1 * | 6/2018 | Bestler | H03M 1/0641 |
| 2018/0172831 | A1 * | 6/2018 | Wohlgenannt | G01S 7/4865 |
| 2019/0195674 | A1 * | 6/2019 | Lovegren | G01S 7/285 |

FOREIGN PATENT DOCUMENTS

| | | | | |
|---|---|---|---|---|
| DE | 102008020035 A1 | 10/2009 | | |
| DE | 102015115462 A1 | 3/2017 | | |
| DE | 102017207783 B3 | 6/2018 | | |
| DE | 102017207783 B3 * | 6/2018 | ......... | G01F 23/284 |
| DE | 102018127012 A1 | 4/2020 | | |
| EP | 1072871 A2 * | 1/2001 | ......... | G01F 23/284 |
| EP | 1072871 A2 | 1/2001 | | |
| EP | 1000368 B1 * | 8/2003 | ............ | G01S 13/18 |
| WO | 0102819 A1 | 1/2001 | | |
| WO | WO-2007042367 A1 * | 4/2007 | ......... | G01F 23/284 |
| WO | 2016202533 A1 | 12/2016 | | |

* cited by examiner

FILL LEVEL MEASURING DEVICE

CROSS-REFERENCE TO RELATED APPLICATIONS

The present application is related to and claims the priority benefit of German Patent Application No. 10 2018 123 429.5, filed on Sep. 24, 2018 and International Patent Application No. PCT/EP2019/072118, filed on Aug. 19, 2019, the entire contents of which are incorporated herein by reference.

TECHNICAL FIELD

The invention relates to a method for the fill-level measurement of a filling material located in a container, and to a fill-level measuring device for carrying out said method.

BACKGROUND

In process automation technology, field devices for capturing or modifying process variables are generally used. For this purpose, the functioning of the field devices is in each case based on suitable measuring principles in order to capture the corresponding process variables, such as fill level, flow rate, pressure, temperature, pH value, redox potential or conductivity. A wide variety of such field devices is manufactured and distributed by the Endress+Hauser company.

For measuring the fill level of filling materials in containers, radar-based measuring methods have become established since they are robust and are low maintenance. Within the scope of the invention, the term "container" also refers to containers that are not closed, such as basins, lakes, or flowing bodies of water. A central advantage of radar-based measuring methods is the ability to measure the fill level more-or-less continuously (in the context of this patent application, the term "radar" refers to signals or electromagnetic waves having frequencies between 0.03 GHz and 300 GHz).

In the case of radar-based fill-level measurement, the pulse transit time method is an established measuring principle. Microwave pulses are transmitted cyclically at a defined clock rate in the direction of the filling material, and the transit time until reception of the correspondingly reflected microwave pulse is measured.

In order to determine the transit time or the fill level, a corresponding evaluation signal is recorded based on the received, reflected microwave pulses. Due to the high pulse frequency, the evaluation signal is generated by undersampling the reflected microwave pulses. Undersampling is carried out by mixing the reflected microwave pulses with corresponding generated sampling pulses, wherein their sampling rate deviates by a defined relation from the clock rate of the emitted microwave pulses. To maintain this defined target phase change between the sampling rate and the clock rate, the sampling rate is readjusted by a control loop depending on the measured relation.

Overall, the evaluation signal thus represents the signal amplitude of the reflected microwave pulses in a time-expanded manner. The evaluation signal reflects the signal amplitude of the reflected microwave pulses depending on the measuring distance.

On the basis of the pulse transit time method, fill-level measuring devices with comparatively low circuitry complexity and a high fill-level resolution in the sub-millimeter range can be realized. A radar-based fill-level measuring device which operates according to the pulse transit time method is described, for example, in the unexamined patent application DE 10 2012 104 858 A1.

In addition to freely radiating radar measurement in which the microwave pulses are emitted or received via an antenna, the variant of guided radar also exists. In this case, the microwave pulses are guided via an electrically conductive probe (for example, a coaxial cable or a metal rod) which is lowered into the container. At the location of the filling material surface, the microwave pulses are reflected in the probe and guided back along the probe toward the fill-level measuring device. This variant of radar-based fill-level measurement is also known by the term TDR (time-domain reflectometry). This variant is advantageous in that due to the guided signal radiation, less power is required for operating the fill-level measuring device. Analogous to freely radiating radar devices according to the pulse transit time method, an evaluation signal for determining the fill level is also generated when implementing the TDR principle.

The fill level is determined from the evaluation signal by detection and local assignment of the corresponding local signal maximum. In cases in which the sampling rate for sampling the received microwave pulses does however not correspond to the target sampling rate, the measuring distance corresponding to the signal maximum and thus the fill-level measurement is distorted since the evaluation signal is temporally expanded or compressed depending on the deviation. One reason for a deviation from the target sampling rate can be an inaccurate or slow control of the sampling rate. As a result, the potentially attainable accuracy of the fill-level measuring device is reduced.

SUMMARY

The object of the invention is therefore to provide a more accurate fill-level measuring device.

The invention achieves this object by a method for radar-based measurement of the fill level of a filling material located in a container, comprising the following method steps:
clocked emission of microwave pulses in the direction of the filling material at a defined clock rate,
reception of reflected microwave pulses after reflection at the surface of the filling material,
generation of an evaluation signal by sampling the received microwave pulses at a defined sampling rate,
measurement of a relation between the clock rate and the sampling rate.

According to the invention, the method is characterized in that:
an evaluation curve is generated on the basis of the evaluation signal, the relation between the clock rate and the sampling rate, and a predefined target relation. The fill level is thus determined on the basis of the evaluation curve. In this case, the evaluation curve is generated in particular by means of temporal expansion or compression of the evaluation signal, the compression or the expansion being carried out as a function of a ratio between the measured relation and the target relation.

The advantage of the method according to the invention is that any inaccurate control of the sampling rate is compensated so that the attainable accuracy of the fill-level measurement is potentially increased. This simultaneously reduces the technical requirements for controlling the sampling rate. It goes without saying that the method according to the invention can be used not only for measuring a distance to the filling material surface but also for radar-based distance measurement in general.

In order to compensate for inaccurate control, it is advantageous to carry out the expansion or compression of the evaluation signal to form the evaluation curve proportionally as a function of the ratio between the measured relation and the target relation. That is to say, the greater the ratio of the measured relation to the target relation, the more expansion is necessary. If the ratio is greater than 1, the evaluation signal must be expanded; if the ratio is less than 1, the evaluation signal must be compressed.

On the basis of the evaluation signal, the measured relation and the target relation, the evaluation curve can be generated, for example, by:
  rectifying the evaluation signal if the radar is freely radiating,
  digitizing the (optionally rectified) evaluation signal,
  determining a mathematical function by at least regional approximation of the digitized evaluation signal, and
  generating the evaluation curve by means of temporal expansion or temporal compression of the approximated mathematical function, wherein the compression or the expansion is carried out as a function of the ratio between the measured relation and the target relation.

The type of approximation is not prescribed in a fixed manner within the scope of the invention. The approximation can be implemented, for example, as an optionally partially polynomial approximation, such as a spline. Preferably, a polynomial approximation of the 3rd order or higher is to be implemented. In case of limited computing power, however, an incremental linear approximation of the evaluation signal can also be used, for example.

The fill level can be determined on the basis of the evaluation curve by ascertaining the evaluation curve maximum that is caused by the filling material surface. The corresponding signal transit time is then assigned to this maximum, the fill level being determined on the basis of the measuring distance that corresponds to the signal transit time.

Analogous to the method according to the invention, the object on which the invention is based is achieved by a radar-based fill-level measuring device designed to carry out the method according to at least one of the preceding embodiments. Accordingly, the fill-level measuring device according to the invention comprises the following components:
  a pulse generating unit designed to generate high-frequency electrical pulses having a defined clock rate,
  a transmitting/receiving unit designed
    to emit the high-frequency pulses as microwave pulses in the direction of the filling material, and
    to receive the reflected microwave pulses after reflection at the surface of the filling material,
  a sampling unit designed to generate electrical sampling pulses at a defined sampling rate,
  a mixer designed to mix the received microwave pulses with the sampling pulses in such a way that a time-expanded evaluation signal is generated,
  a detector designed to measure a relation between the sampling rate of the sampling pulses and the clock rate of the high-frequency pulses, and
  an evaluation unit designed
    to generate an evaluation curve on the basis of the evaluation signal, the measured relation and a pre-defined target relation, and
    to determine the fill level on the basis of the evaluation curve.

In this case, the invention does not rule out that the fill-level measuring device additionally controls the sampling rate as a function of the measured relation such that the relation corresponds to the target relation. This compensates for any temperature dependencies or aging effects of the sampling unit and thus likewise reduces the accuracy losses of the fill-level measurement.

Within the context of the invention, the term "unit" is understood to mean in principle an electronic circuit that is designed to be suitable for its intended purpose. Depending on the requirement, it can therefore be an analog circuit for generating or processing corresponding analog signals. However, it can also be a (semiconductor-based) digital circuit, such as an FPGA or a storage medium in interaction with a program. In this case, the program is designed to carry out the corresponding method steps or to apply the necessary calculation operations of the unit in question. In this context, various electronic units of the fill-level measuring device in the sense of the invention can potentially also access a common physical memory or be operated by means of the same physical digital circuit.

BRIEF DESCRIPTION OF THE DRAWINGS

The invention is explained in more detail with reference to the following figures. The following is shown.

DETAILED DESCRIPTION

Figure 1:
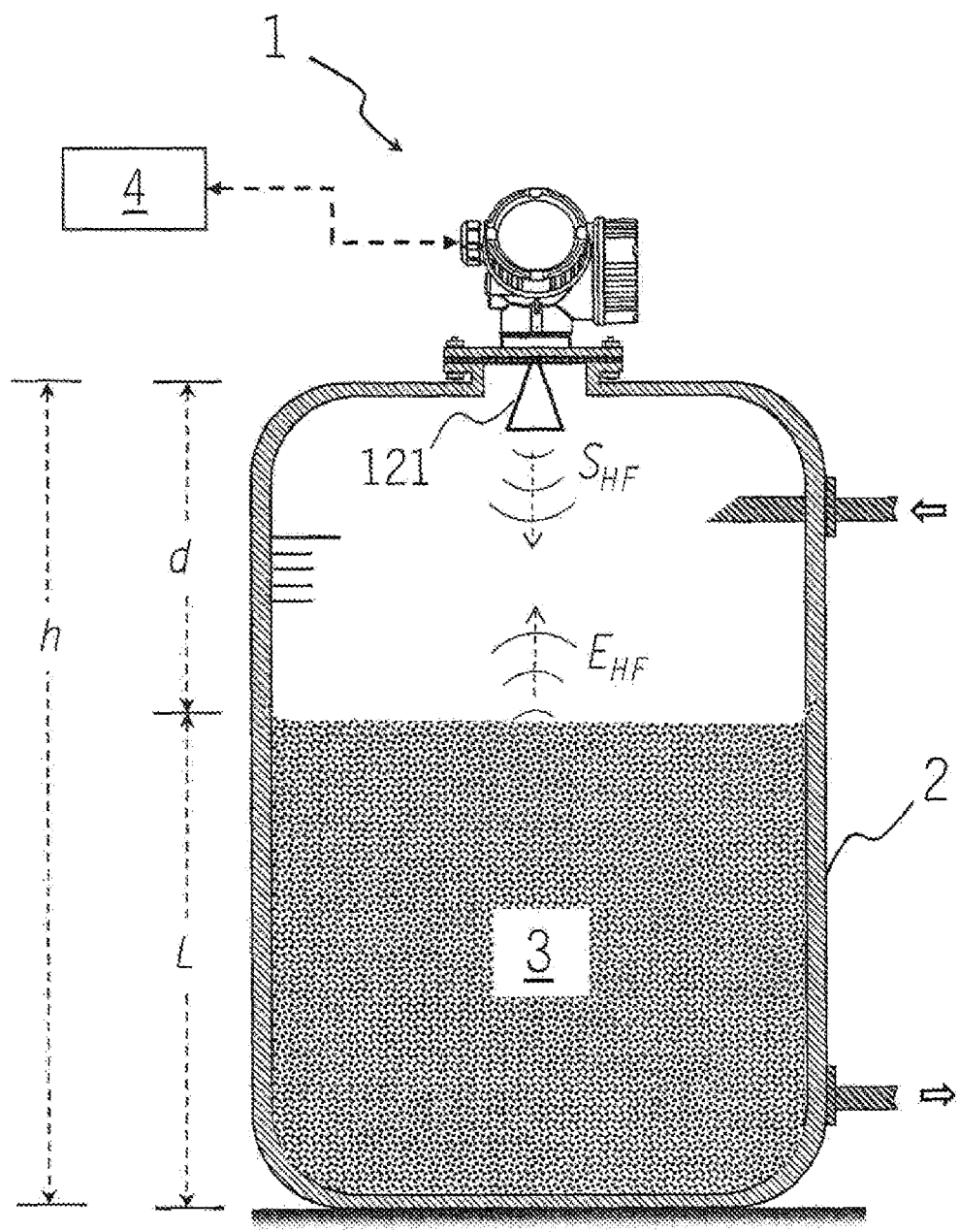
FIG. 1 shows an arrangement of a radar fill-level measuring device.

To fundamentally understand the invention, FIG. 1 shows a typical arrangement of a freely radiating radar-based fill-level measuring device 1 on a container 2. In the container 2 is a filling material 3 whose fill level L is to be determined by the fill-level measuring device 1. For this purpose, the fill-level measuring device 1 is mounted on the container 2 above the maximum permissible fill level L. Depending on the field of application, the height h of the container 2 can be up to 75 m.

As a rule, the fill-level measuring device 1 is connected via a bus system, such as "Ethernet," "PROFIBUS," "HART" or "Wireless HART," to a higher-level unit 4, such as a process control system or a decentralized database. On the one hand, information about the operating status of the fill-level measuring device 1 can thus be communicated. On the other hand, information about the fill level L can also be transmitted in order to control any inflows and/or outflows that may be present at the container 2.

Since the fill-level measuring device 1 shown in FIG. 1 is designed as freely radiating radar, it comprises a corresponding antenna 121. As indicated, the antenna 121 can be designed as a horn antenna, for example. Especially in the case of radar frequencies above 100 GHz, the antenna 121 can also be realized as a planar antenna. Regardless of the design, the antenna 121 is oriented such that corresponding microwave pulses $S_{HF}$ are emitted in the direction of the filling material 3 according to the pulse transit time method.

The microwave pulses $E_{HF}$ are reflected at the surface of the filling material 3 and, after a corresponding signal transit time, are received as corresponding electrical receive signals $e_{HF}$ at the antenna 121. In this case, the signal transit time of the microwave pulses $S_{HF}$, $E_{HF}$ is a function of the distance d=h−L of the fill-level measuring device 1 from the filling material surface.

Figure 2:
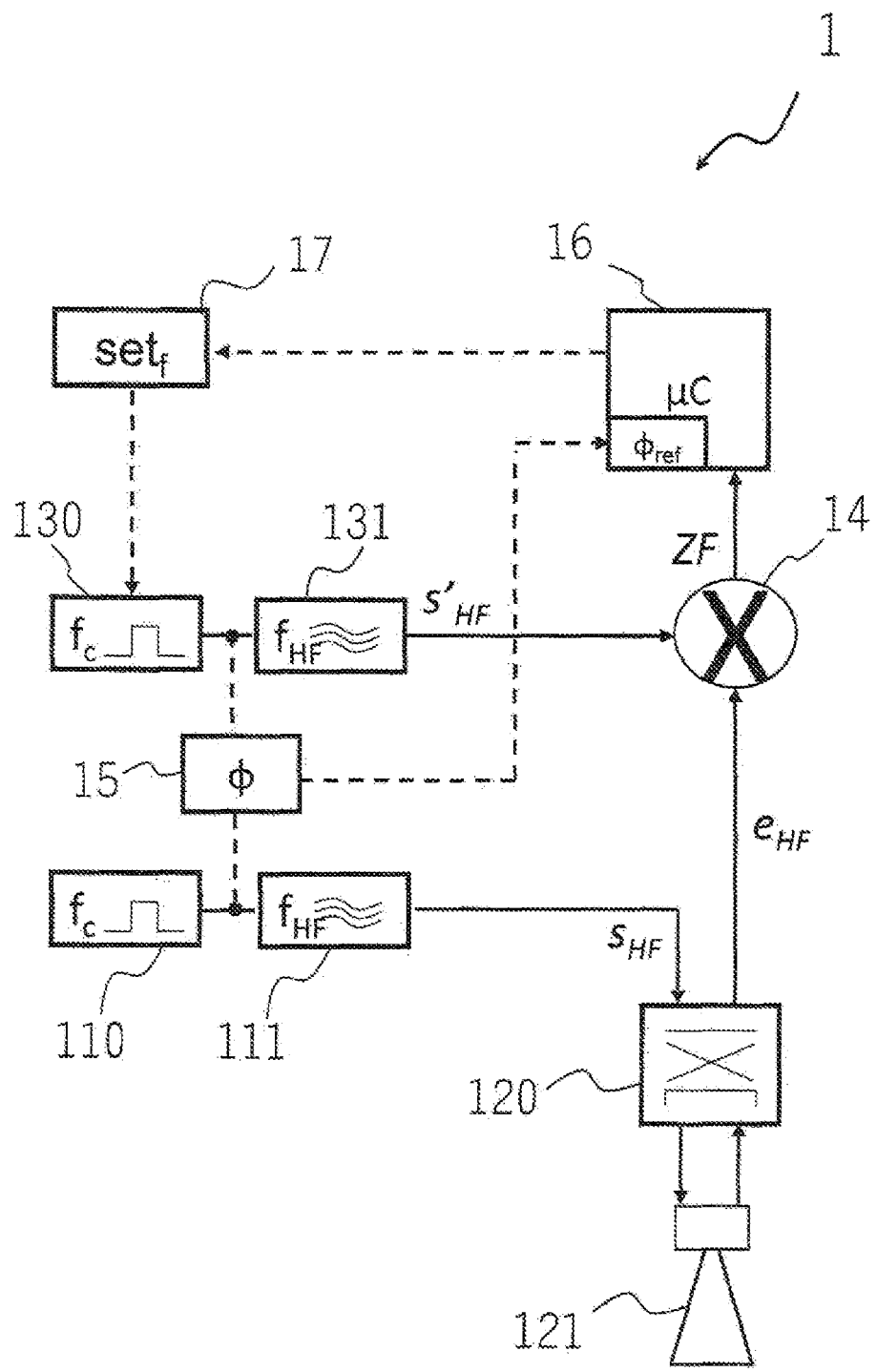
FIG. 2 shows a circuit technology structure of the fill-level measuring device.

A circuitry design of the fill-level measuring device 1 with which the microwave pulses $S_{HF}$ can be generated and with which the fill level L can be determined on the basis of the electrical receive signals $e_{HF}$ is shown in FIG. 2:

In order to generate the microwave pulses $S_{HF}$, the circuit of the fill-level measuring device 1 shown in FIG. 2 comprises a pulse generating unit. The pulse generating unit is designed to generate high-frequency electrical pulses $s_{HF}$ at a defined clock rate $f_c$. For this purpose, the pulse generating unit in the shown exemplary embodiment consists of a first pulse generator 110 which drives a first high-frequency oscillator 111. The frequency of the microwave pulses $S_{HF}$, $E_{HF}$ is established by the oscillation frequency of the high-frequency oscillator 111. In the simplest case, the high-frequency oscillator 111 can be designed as a quartz oscillator. A VCO (voltage-controlled oscillator) can also be used. In this case, the high-frequency oscillator 111 is driven by the pulse generator 110 by means of a DC voltage signal. The pulse generator 110 thereby defines the pulse duration of the individual microwave pulses $S_{HF}$ and the clock rate $f_c$ at which the microwave pulses $S_{HF}$ are emitted. Normally, a semiconductor-based digital resonant circuit is used as the high-frequency oscillator 111. In practice, the clock rate is between 100 kHz and 1 MHz.

The high-frequency pulses $s_{HF}$ thereby generated by the high-frequency oscillator 111 are supplied to the antenna 121 via a transmitting/receiving switch 120 so that they are correspondingly emitted as microwave pulses $S_{HF}$. Since the reflected microwave pulses $E_{HF}$ are also received via the antenna 121, the transmitting/receiving switch 120 supplies the corresponding electrical receive signal $e_{HF}$ to a mixer 14.

In contrast to the shown embodiment variant, instead of the antenna 121, an electrically conductive probe such as a waveguide or a coaxial cable extending toward the container bottom can also be used. In the implementation of this embodiment variant known by the term TDR (time-domain reflectometry), the high-frequency oscillators 111, 131 are not required in contrast to the circuit shown in FIG. 2.

The undersampling of the receive signal $e_{HF}$ characteristic for the pulse transit time method is performed by the mixer 14. For this purpose, the receive signal $e_{HF}$ is mixed with electrical sampling pulses $s'_{HF}$ by the mixer 14. In this case, the sampling rate $f'_c$ at which the sampling pulses $s'_{HF}$ are generated deviates by a defined, low relation of far less than 0.1 per thousand from the clock rate $f_c$ of the generated high-frequency pulses $s_{HF}$.

The sampling pulses $s'_{HF}$ are generated by a sampling unit which, analogously to the pulse generating unit, comprises a second pulse generator 130 and a second high-frequency oscillator 131. Thus, correspondingly to the high-frequency pulses $s_{HF}$, the frequency $f_{HF}$ of the sampling pulses $s'_{HF}$ is defined by the second high-frequency oscillator 131. The second pulse generator 130 controls the sampling rate $f'_c$ at which the sampling pulses $s'_{HF}$ are generated.

By mixing the receive signal $e_{HF}$ with the electrical sampling pulses $s'_{HF}$ by means of the mixer 14, an evaluation signal ZF is generated, which represents the receive signal $e_{HF}$ in a time-expanded manner. The time expansion factor is proportional to the relation $\varphi$ between the clock rate $f_c$ and the sampling rate $f'_c$.

Figure 3:
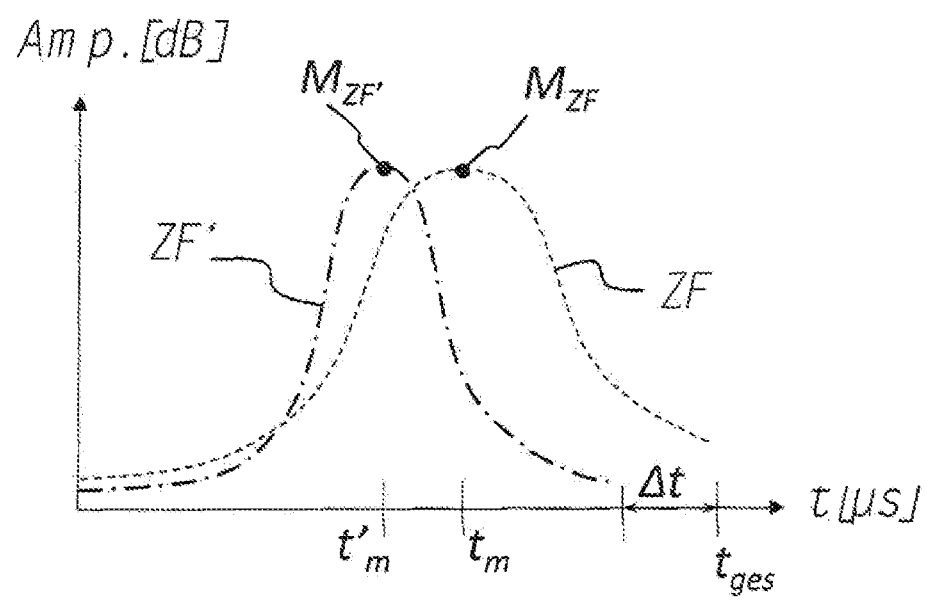
FIG. 3 shows an evaluation curve according to the present disclosure.

The time expansion is advantageous in that the evaluation signal ZF can be evaluated considerably more easily technically due to the time expansion in comparison with the pure receive signal $e_{HF}$: The reason for this is that the receive signal $e_{HF}$ has a correspondingly short time scale tin the nanosecond range due to the high speed of propagation of the microwave pulses $S_{HF}$, $E_{HF}$ at the speed of light. The time expansion results in the evaluation signal ZF having a time scale in the millisecond range. An evaluation curve ZF is schematically illustrated in FIG. 3: According to the prior art, the fill level L is determined based on the evaluation signal ZF by identifying an amplitude maximum $M_{ZF}$ of the evaluation signal ZF that corresponds to the microwave pulse $E_{HF}$ reflected by the filling material surface. By using the signal transit time $t_m$ assigned to the maximum $M_{ZF}$, an evaluation unit 16 of the fill-level measuring device 1 can determine the distance d to the surface of the filling material 3 in order to derive the fill level L therefrom.

To correctly determine the fill level L based on the evaluation signal ZF, it is essential that the sampling rate $f'_c$ of the sampling unit corresponds exactly to its target sampling rate: This means that the relation $\varphi$ to the clock rate $f_c$ of the pulse generating unit corresponds to a required target relation $\varphi_{ref}$. In order that the sampling rate $f'_c$ does not drift therefrom, it is correspondingly controlled. In the exemplary embodiment shown in FIG. 2, the control takes place by a detector 15 which measures the relation $\varphi$ between the clock rate $f_c$ and the sampling rate $f'_c$ downstream of the first pulse generator 110 or the second pulse generator 130. This can be technically implemented, for example, by the detector 15 measuring, over a plurality of phases, a change in the time shift between the positive flank at the first pulse generator 110 and the positive flank at the second pulse generator 130.

From the change in the time shift, the evaluation unit 16 calculates the relation $\varphi$ between the clock rate $f_c$ and the sampling rate $f'_c$. The evaluation unit 16 also compares the determined relation $\varphi$ between the clock rate $f_c$ and the sampling rate $f'_c$ with a stored target relation $\varphi_{ref}$. In this way, the evaluation unit 16 can control the sampling rate $f'_c$ at the second pulse generator 130 as a function of the measured relation $\varphi$ such that the relation $\varphi$ corresponds to the target relation $\varphi_{ref}$. In the embodiment variant shown in FIG. 2, a signal converter 17 is interposed between the evaluation unit 16 and the second pulse generator 130 in order to provide an analog control signal to the pulse generator 130. For this purpose, the signal converter 17 can be designed, for example, as a DAC driving a capacitance diode.

Depending on the technical implementation of the control, the control may have an imprecise, overcontrolling or delayed effect. These effects lead to a distorted measurement of the fill level L since the evaluation signal ZF is thereby inadvertently temporally expanded or compressed. The maximum $M_{ZF}$ corresponding to the filling material surface is thereby shifted in the evaluation signal ZF.

According to the invention, this distortion is counteracted in that the evaluation unit 16 either temporally expands or temporally compresses the stored, digitized evaluation signal ZF as a function of the ratio $\varphi/\varphi_{ref}$ between the measured relation $\varphi$ and the target relation $\varphi_{ref}$. Since the measurement is a freely radiating radar measurement, the evaluation signal ZF is initially rectified before the A/D conversion, in contrast to guided radar.

The evaluation unit 16 can carry out the expansion or compression by the value Δt by generating a mathematical function using the rectified and digitized evaluation signal ZF. For this purpose, the evaluation signal ZF can be fitted by means of polynomial interpolation, for example. The evaluation curve ZF' is subsequently generated by means of temporal expansion or temporal compression of the approximated mathematical function by the value Δt.

The temporal expansion or compression Δt is proportional to the ratio $\varphi/\varphi_{ref}$ between the measured relation $\varphi$ and the target relation $\varphi_{ref}$. The greater the ratio $\varphi/\varphi_{ref}$ is, the more the evaluation signal is expanded. Whether the evaluation signal ZF is expanded or compressed in the evaluation unit 16 depends on whether the resulting ratio $\varphi/\varphi_{ref}$ is greater or less than 1 or greater or less than 100%. In the exemplary illustration in FIG. 3, the evaluation signal ZF is compressed by Δt. The compression Δt is thus based on the relationship $$\frac{t_{ges} - \Delta t}{t_{ges}} = const * \frac{\varphi}{\varphi_{ref}}$$

The evaluation unit 16 subsequently determines the fill level L by means of the evaluation curve ZF' thus obtained. The fill level L is determined by the evaluation unit 16 ascertaining the maximum $M_{ZF'}$ of the evaluation curve ZF' that is caused by the surface of the filling material 3 (in the schematic evaluation curve ZF' illustrated in FIG. 3, this maximum $M_{ZF'}$ is shown exclusively for reasons of illustration). After determining the maximum $M_{ZF'}$, the signal transit time $t'_m$ that corresponds to the maximum $M_{ZF'}$ is determined. The evaluation unit 16 can thus determine the fill level L according to the relationship L=h−d by using the measuring distance d that corresponds to the signal transit time $t'_m$.

As FIG. 3 indicates, the maximum $M_{ZF'}$ of the evaluation curve ZF' is corrected in comparison with the evaluation signal ZF by the compression Δt toward a lower signal transit time $t'_m$. The invention thus compensates for any unwanted compression or expansion of the evaluation signal ZF, provided that the sampling rate $f_c$ deviates from its setpoint value due to a faulty control. In addition to an improved accuracy of the fill-level measurement, this also offers the advantage that the fill-level measuring device 1 can be designed to be less complex with regard to the control of the sampling rate $f_c$.

The invention claimed is:

1. A method for radar-based measurement of a fill level of a filling material located in a container, the method comprising:
   emitting microwave pulses in a direction of the filling material at a defined clock rate;
   receiving reflected microwave pulses after reflection of the emitted microwave pulses at a surface of the filling material;
   generating an evaluation signal by sampling the received microwave pulses at a defined sampling rate;
   measuring a relation between the clock rate and the sampling rate;
   generating an evaluation curve by using the evaluation signal, the relation between the clock rate and the sampling rate, and a predefined target relation; and
   determining the fill level by using the evaluation curve,
   wherein the evaluation curve is generated by a temporal expansion or compression of the evaluation signal, wherein the compression or the expansion is carried out as a function of a ratio between the measured relation and the target relation.

2. The method according to claim 1,
   wherein the expansion or compression (Δt) is carried out according to the relationship:

$$\frac{t_{ges} - \Delta t}{t_{ges}} = \frac{\varphi}{\varphi_{ref}}$$

proportionally as a function of the ratio $(\varphi/\varphi_{ref})$ between the measured relation $(\varphi)$ and the target relation $(\varphi_{ref})$, wherein $t_{ges}$ is total time of the evaluation signal.

3. The method according to claim 2,
   wherein the evaluation curve is generated by using the evaluation signal, the measured relation, and the target relation by:
   digitizing the evaluation signal;
   determining a mathematical function by at least a regional approximation of the digitized evaluation signal; and
   generating the evaluation curve by means of temporal expansion or temporal compression of the approximated mathematical function, wherein the compression or the expansion is carried out as a function of the ratio between the measured relation and the target relation.

4. The method according to claim 3,
   wherein the approximation is carried out as a polynomial approximation.

5. The method according to claim 1,
   wherein the fill level is determined by using the evaluation curve by:
   ascertaining a maximum of the evaluation curve;
   assigning a signal transit time corresponding to the maximum; and
   determining the fill level by using a measuring distance that corresponds to the signal transit time.

6. A radar-based fill-level measuring device, comprising:
   a pulse generating unit designed to generate high-frequency electrical pulses having a defined clock rate;
   a transmitting/receiving unit designed:
     to emit the high-frequency pulses as microwave pulses in a direction of a filling material, and
     to receive reflected microwave pulses after reflection at a surface of the filling material;
   a sampling unit designed to generate electrical sampling pulses at a defined sampling rate;
   a mixer designed to mix the received microwave pulses with the sampling pulses such that an evaluation signal is generated;
   a detector designed to measure a relation between the sampling rate of the sampling pulses and the clock rate of the high-frequency pulses; and
   an evaluation unit designed:
     to generate an evaluation curve by using the evaluation signal, the measured relation, and a predefined target relation, and
     to determine the fill level on the basis of the evaluation curve,
     wherein the evaluation curve is generated by a temporal expansion or compression of the evaluation signal, wherein the compression or the expansion is carried out as a function of a ratio between the measured relation and the target relation.

7. The fill-level measuring device according to claim 6, wherein the fill-level measuring device is designed to control the sampling rate as a function of the measured relation such that the relation corresponds to the target relation.

* * * * *